US010936293B2

(12) United States Patent
Varadharajan Kannan

(10) Patent No.: US 10,936,293 B2
(45) Date of Patent: *Mar. 2, 2021

(54) CONTAINER IMAGE LAYER REORDERING

(71) Applicant: INTERNATIONAL BUSINESS MACHINES CORPORATION, Armonk, NY (US)

(72) Inventor: Kishore Kumar Varadharajan Kannan, Brampton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,376

(22) Filed: Jan. 2, 2020

(65) Prior Publication Data
US 2020/0142680 A1  May 7, 2020

Related U.S. Application Data

(63) Continuation of application No. 16/169,531, filed on Oct. 24, 2018, now Pat. No. 10,528,337.

(51) Int. Cl.
| | | |
|---|---|---|
| *G06F 9/44* | (2018.01) | |
| *G06F 8/61* | (2018.01) | |
| *G06F 8/71* | (2018.01) | |
| *G06F 8/65* | (2018.01) | |
| *G06F 16/901* | (2019.01) | |

(52) U.S. Cl.
CPC ............ *G06F 8/63* (2013.01); *G06F 8/65* (2013.01); *G06F 8/71* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 9,639,558 B2* | 5/2017 | Alton | G06F 8/60 |
| 2017/0177860 A1* | 6/2017 | Suarez | G06F 8/60 |
| 2017/0177877 A1 | 6/2017 | Suarez et al. | |
| 2018/0088926 A1* | 3/2018 | Abrams | G06F 8/658 |

OTHER PUBLICATIONS

IBM, List of IBM Patents or Patent Applications Treated as Related, Appendix P, dated Jan. 3, 2020, 2 pages.
Claus Pahl, "Containerization and the PaaS Cloud," IEEE Cloud Computing, 2015.
Pending U.S. Appl. No. 16/169,531, filed Oct. 24, 2018, entitled: "Container Image Layer Reordering", pp. 1-38.

* cited by examiner

*Primary Examiner* — Qamrun Nahar
(74) *Attorney, Agent, or Firm* — Richard A. Wilhelm

(57) ABSTRACT

A method, computer program product, and computer system for constructing, by a computing device, a dependency graph using dependency links provided between layers of an image. Versions of the image may be inspected. Update frequencies of the layers of the image may be identified. A rank to the layers of the image may be assigned based upon, at least in part, the update frequencies of the layers of the image. A new layer arrangement for the image may be generated by ordering the new layer arrangement between a lowest ranked layer and a highest ranked layer based upon, at least in part, the dependency graph. A new standardized deployment image may be built using the image layers reordered in the new layer arrangement.

20 Claims, 8 Drawing Sheets

Layer Inspection Table

| Layer | V1-latest | V2-latest | V3-latest |
|---|---|---|---|
| 1 | "CreatedBy": "/bin/sh -c #(nop) CMD [\"node\"]", "id": "sha256:f75ce8084ed7eec3", "Size": 0, "Tags": [ "node:baron" ] | "CreatedBy": "/bin/sh -c #(nop) CMD [\"node\"]", "id": "sha256:f75ce8084ed7eec3", "Size": 0, "Tags": [ "node:baron" ] | "CreatedBy": "/bin/sh -c #(nop) CMD [\"node\"]", "id": "sha256:f75ce8084ed7eec3", "Size": 0, "Tags": [ "node:baron" ] |
| 2 | "CreatedBy": "/bin/sh -c #(nop) WORKDIR /usr/src/app", "id": "sha256:17c92e58974a8e93a", "Size": 0, "Tags": null | "CreatedBy": "/bin/sh -c #(nop) WORKDIR /usr/src/app", "id": "sha256:17c92e58974a8e93a", "Size": 0, "Tags": null | "CreatedBy": "/bin/sh -c #(nop) WORKDIR /usr/src/app", "id": "sha256:17c92e58974a8e93a", "Size": 0, "Tags": null |
| 3 | "CreatedBy": "COPYfile:093dd3f8b06295ed0c0d8", "id": "sha256:3c6dc48f75048547313", "Size": 247, "Tags": null | "CreatedBy": "COPYfile:65f211d5f22805efd7e", "id": "sha256:2fd56357a747be3", "Size": 250, "Tags": null | "CreatedBy": "COPYfile:c01b0f353ca3ee26a3d", "id": "sha256:2a8f065-4a5f8ff98", "Size": 254, "Tags": null |
| 4 | "CreatedBy": "/bin/sh -c npm install", "id": "sha256:32b451ee6089f7489", "Size": 3395935, "Tags": null | "CreatedBy": "/bin/sh -c npm install", "id": "sha256:51e4642413f91fd54", "Size": 3395935, "Tags": null | "CreatedBy": "/bin/sh -c npm install", "id": "sha256:4cc73eb47c0c83d6c", "Size": 3395935, "Tags": null |
| 5 | "CreatedBy": "/bin/sh -c #(nop) COPY dir:08433fdc43ech9071e in..", "id": "sha256:877e631847aecd299", "Size": 592, "Tags": null | "CreatedBy": "/bin/sh -c #(nop) COPY dir:cdb9f1a5f4ef6a4d4a4914..", "id": "sha256:3ebeac52a2c7c6e109", "Size": 592, "Tags": null | "CreatedBy": "/bin/sh -c #(nop) COPY dir:1773e916ffbb6dab76eb", "id": "sha256:6b9dc550532ea", "Size": 592, "Tags": null |
| 6 | "CreatedBy": "/bin/sh -c #(nop) EXPOSE 8080/tcp", "id": "sha256:37e4359a8dd6398a4", "Size": 0, "Tags": null | "CreatedBy": "/bin/sh -c #(nop) EXPOSE 8080/tcp", "id": "sha256:1951844047c0f9afb", "Size": 0, "Tags": null | "CreatedBy": "/bin/sh -c #(nop) EXPOSE 8080/tcp", "id": "sha256:8613d66e7aef6e7fc66", "Size": 0, "Tags": null |
| 7 | "CreatedBy": "/bin/sh -c #(nop) CMD [\"npm\" \"start\"]", "id": "sha256:47f710e67724f1b4d", "Size": 0, "Tags": [ "sample-app:v1-latest" ] | "CreatedBy": "/bin/sh -c #(nop) CMD [\"npm\" \"start\"]", "id": "sha256:161ec9164155063", "Size": 0, "Tags": [ "sample-app:v2-latest" ] | "CreatedBy": "/bin/sh -c #(nop) CMD [\"npm\" \"start\"]", "id": "sha256:45b244e10ae15d7eb5", "Size": 0, "Tags": [ "sample-app:v3-latest" ] |

Latest Version Dockerfile

```
FROM node:boron
# Create app directory
WORKDIR /usr/src/app
# Install app dependencies
COPY package.json .
RUN npm install
# Bundle app source
COPY . .
EXPOSE 8080
CMD [ "npm", "start" ]
```

Layer Rank Table

| Layer | Rank |
|---|---|
| 1 (Base Image layer) | 3 |
| 2 | 3 |
| 3 | 1 |
| 4 | 2 |
| 5 | 3 |
| 6 | 3 |
| 7 | 2 |

Final Reordered Layers

```
FROM node:boron
WORKDIR /usr/src/app
COPY . .
EXPOSE 8080
COPY package.json .
RUN npm install
CMD [ "npm", "start" ]
```

CONTAINER IMAGE LAYER REORDERING

BACKGROUND

Generally, containers may be described as virtual environments providing portability to a set of encapsulated applications. Such containerization platforms may help simplify environment standardization, so that the deployment of applications may be instant. An example containerization platform may include Docker®, which may use a feature known as an overlay file system to implement a copy-on-write process that stores any updated information to a root file system of a container, compared to the original image on which it is based. Each container may be an image with a readable/writeable layer on top of many read-only layers. These layers (also called intermediate images) may be generated when the commands in the Dockerfile are executed during the Docker image build.

BRIEF SUMMARY OF DISCLOSURE

In one example implementation, a method, performed by one or more computing devices, may include but is not limited to constructing, by a computing device, a dependency graph using dependency links provided between layers of an image. Versions of the image may be inspected. Update frequencies of the layers of the image may be identified. A rank to the layers of the image may be assigned based upon, at least in part, the update frequencies of the layers of the image. A new layer arrangement for the image may be generated by ordering the new layer arrangement between a lowest ranked layer and a highest ranked layer based upon, at least in part, the dependency graph. A new standardized deployment image may be built using the image layers reordered in the new layer arrangement.

One or more of the following example features may be included. Inspecting the versions of the image may include identifying dependent layers and independent layers in the image. The layers of the image may be shared across different images in a build. The update frequencies of the layers of the image may be identified using an image identifier. A highest rank may be assigned to the layer of the image that is most frequently updated and a lowest rank may be assigned to the layer of the image that is least frequently updated. The new standardized deployment image may be provided for use in a rebuild.

In another example implementation, a computing system may include one or more processors and one or more memories configured to perform operations that may include but are not limited to constructing a dependency graph using dependency links provided between layers of an image. Versions of the image may be inspected. Update frequencies of the layers of the image may be identified. A rank to the layers of the image may be assigned based upon, at least in part, the update frequencies of the layers of the image. A new layer arrangement for the image may be generated by ordering the new layer arrangement between a lowest ranked layer and a highest ranked layer based upon, at least in part, the dependency graph. A new standardized deployment image may be built using the image layers reordered in the new layer arrangement.

One or more of the following example features may be included. Inspecting the versions of the image may include identifying dependent layers and independent layers in the image. The layers of the image may be shared across different images in a build. The update frequencies of the layers of the image may be identified using an image identifier. A highest rank may be assigned to the layer of the image that is most frequently updated and a lowest rank may be assigned to the layer of the image that is least frequently updated. The new standardized deployment image may be provided for use in a rebuild.

In another example implementation, a computer program product may reside on a computer readable storage medium having a plurality of instructions stored thereon which, when executed across one or more processors, may cause at least a portion of the one or more processors to perform operations that may include but are not limited to constructing a dependency graph using dependency links provided between layers of an image. Versions of the image may be inspected. Update frequencies of the layers of the image may be identified. A rank to the layers of the image may be assigned based upon, at least in part, the update frequencies of the layers of the image. A new layer arrangement for the image may be generated by ordering the new layer arrangement between a lowest ranked layer and a highest ranked layer based upon, at least in part, the dependency graph. A new standardized deployment image may be built using the image layers reordered in the new layer arrangement.

One or more of the following example features may be included. Inspecting the versions of the image may include identifying dependent layers and independent layers in the image. The layers of the image may be shared across different images in a build. The update frequencies of the layers of the image may be identified using an image identifier. A highest rank may be assigned to the layer of the image that is most frequently updated and a lowest rank may be assigned to the layer of the image that is least frequently updated. The new standardized deployment image may be provided for use in a rebuild.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 5 is an example diagrammatic view of a layer inspection table according to one or more example implementations of the disclosure;

FIG. 6 is an example diagrammatic view of a latest version Dockerfile according to one or more example implementations of the disclosure;

FIG. 7 is an example diagrammatic view of a layer rank table according to one or more example implementations of the disclosure; and FIG. 8 is an example diagrammatic view of final reordered layers according to one or more example implementations of the disclosure.

Like reference symbols in the various drawings indicate like elements.

DETAILED DESCRIPTION

Figure 1:
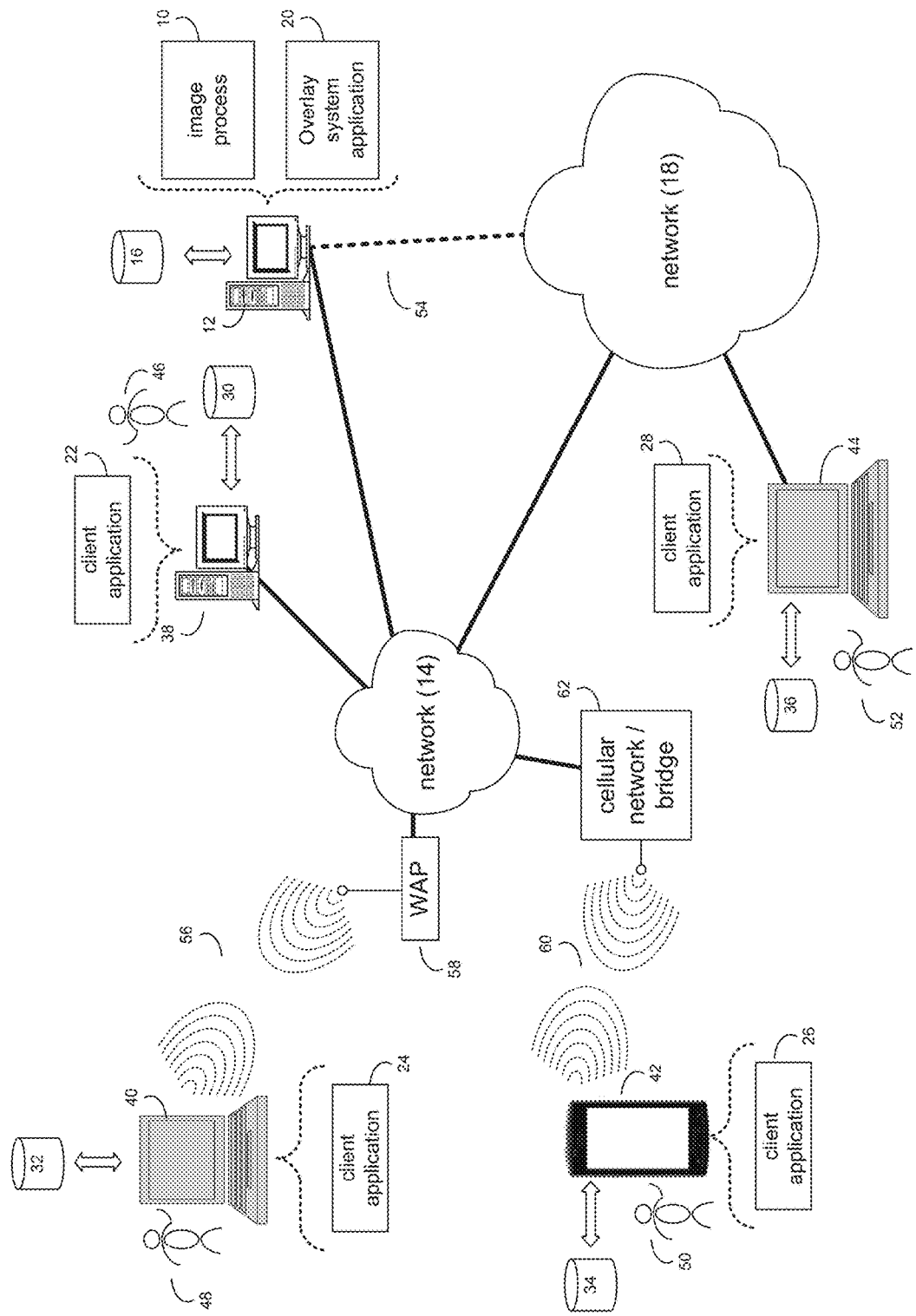
FIG. 1 is an example diagrammatic view of an image process coupled to an example distributed computing network according to one or more example implementations of the disclosure.

System Overview:

Generally, containers may be described as virtual environments providing portability to a set of encapsulated applications. Docker® (offered by Docker Inc, San Francisco, Calif., U.S.A.), and Windows Containers (offered by Microsoft Corp., Redmond, Wash., U.S.A.) are two examples of container-based virtualization offerings. A container may be instantiated from a container image by a container engine or host that provides a runtime environment for the image. Much like a virtual machine, a container may be stopped/paused and started when needed, though containers are generally lighter-weight than virtual machines. Such containerization platforms may help simplify environment standardization, so that the deployment of applications may be instant. Docker (or similarplatform) may use a feature known as an overlay file system to implement a copy-on-write process that stores any updated information to a root file system of a container, compared to the original image on which it is based. Each container may be an image with a readable/writeable layer on top of many read-only layers. These layers (also called intermediate images) may be generated when the commands in the Dockerfile are executed during the Docker image build.

It may be beneficial in building a Docker image to have a proper layering in place so that they may make use of a cache during a Docker build as part of continuous integration. To set up a Docker build process, developers usually spend a considerable amount of time to construct a Dockerfile by, e.g., choosing the right set of instructions/layers to "dockerize" their application starting from choosing the right base-image layer to the application startup command layer. Every Continuous Integration (CI) build that produces Docker images may take considerable amounts of time to rebuild the images even when there is a minimal change in the application. In this example scenario, the importance of layering has not been realized to save the image build time based on the changes in the application. As will be discussed in greater detail below, rearranging and modifying the Docker image layers may not only improve the image build time but may also reduce the size of the image. Thus, the present disclosure describes an image building technique to improve the performance of the image builds (e.g., Docker image builds) and address the storage issues related to different versions of images (e.g., Docker images) stored in various build machines.

Moreover, the present disclosure may make use of Docker's cache-from API to share the image layers across different images in a build machine, and may provide a process (e.g., an automated process) to identify the layers modified frequently and then rearrange it on a periodic basis. Generally, if developers wanted to improve caching in their current Docker builds, they may have to be aware of the present image layers, previously built image layers, the upcoming changes to the application layers, and the dependencies between each layers. At least because the time and effort spent to analyze all the image layers for each of the built Docker image to improve caching on a regular basis is substantial and difficult to keep track of each image layer changes for every Docker builds to identify cacheable layers, doing so manually is simply not realistic. Additionally, one of the potential issues that may be encountered during manual tracking/identification is that the build machine may run out of space as the image layers are not shared, so cleanup operations would likely have to be done periodically to prevent this issue, adding to the unrealistic technique of doing so manually. Thus, according to the present disclosure, an automated reordering of the layers may improve caching.

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java®, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown image process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows® Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a image process, such as image process 10 of FIG. 1, may construct, by a computing device, a dependency graph using dependency links provided between layers of an image. Versions of the image may be inspected. Update frequencies of the layers of the image may be identified. A rank to the layers of the image may be assigned based upon, at least in part, the update frequencies of the layers of the image. A new layer arrangement for the image may be generated by ordering the new layer arrangement between a lowest ranked layer and a highest ranked layer based upon, at least in part, the dependency graph. A new standardized deployment image may be built using the image layers reordered in the new layer arrangement.

In some implementations, the instruction sets and subroutines of image process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, image process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a overlay system application (e.g., overlay system application 20), examples of which may include, but are not limited to, e.g., an overlay file system application (e.g., Docker), or other application that allows for feature uses known as an overlay file system to implement a copy-on-write process that stores any updated information to a root file system of a container, compared to an original image on which it is based. In some implementations, image process 10 and/or overlay system application 20 may be accessed via one or more of client applications 22, 24, 26, 28. In some implementations, image process 10 may be a standalone application, or may be an applet/application/script/extension that may interact with and/or be executed within overlay system application 20, a component of overlay system application 20, and/or one or more of client applications 22, 24, 26, 28. In some implementations, overlay system application 20 may be a standalone application, or may be an applet/application/script/extension that may interact with and/or be executed within image process 10, a component of image process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of image process 10 and/or overlay system application 20. Examples of client applications 22, 24, 26, 28 may include, but are not limited to, e.g., an overlay file system application (e.g., Docker), or other application that allows for feature uses known as an overlay file system to implement a copy-on-write process that stores any updated information to a root file system of a container, compared to an original image on which it is based, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of image process 10 (and vice versa). Accordingly, in some implementations, image process 10 may be a purely server-side application, a purely client-side application, or a hybrid server-side/client-side application that is cooperatively executed by one or more of client applications 22, 24, 26, 28 and/or image process 10.

In some implementations, one or more of client applications 22, 24, 26, 28 may be configured to effectuate some or all of the functionality of overlay system application 20 (and vice versa). Accordingly, in some implementations, overlay system application 20 may be a purely server-side application, a purely client-side application, or a hybrid server-side/client-side application that is cooperatively executed by one or more of client applications 22, 24, 26, 28 and/or overlay system application 20. As one or more of client applications 22, 24, 26, 28, image process 10, and overlay system application 20, taken singly or in any combination, may effectuate some or all of the same functionality, any description of effectuating such functionality via one or more of client applications 22, 24, 26, 28, image process 10, overlay system application 20, or combination thereof, and any described interaction(s) between one or more of client applications 22, 24, 26, 28, image process 10, overlay system application 20, or combination thereof to effectuate such functionality, should be taken as an example only and not to limit the scope of the disclosure.

In some implementations, one or more of users 46, 48, 50, 52 may access computer 12 and image process 10 (e.g., using one or more of client electronic devices 38, 40, 42, 44) directly through network 14 or through secondary network 18. Further, computer 12 may be connected to network 14 through secondary network 18, as illustrated with phantom link line 54. Image process 10 may include one or more user interfaces, such as browsers and textual or graphical user interfaces, through which users 46, 48, 50, 52 may access image process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
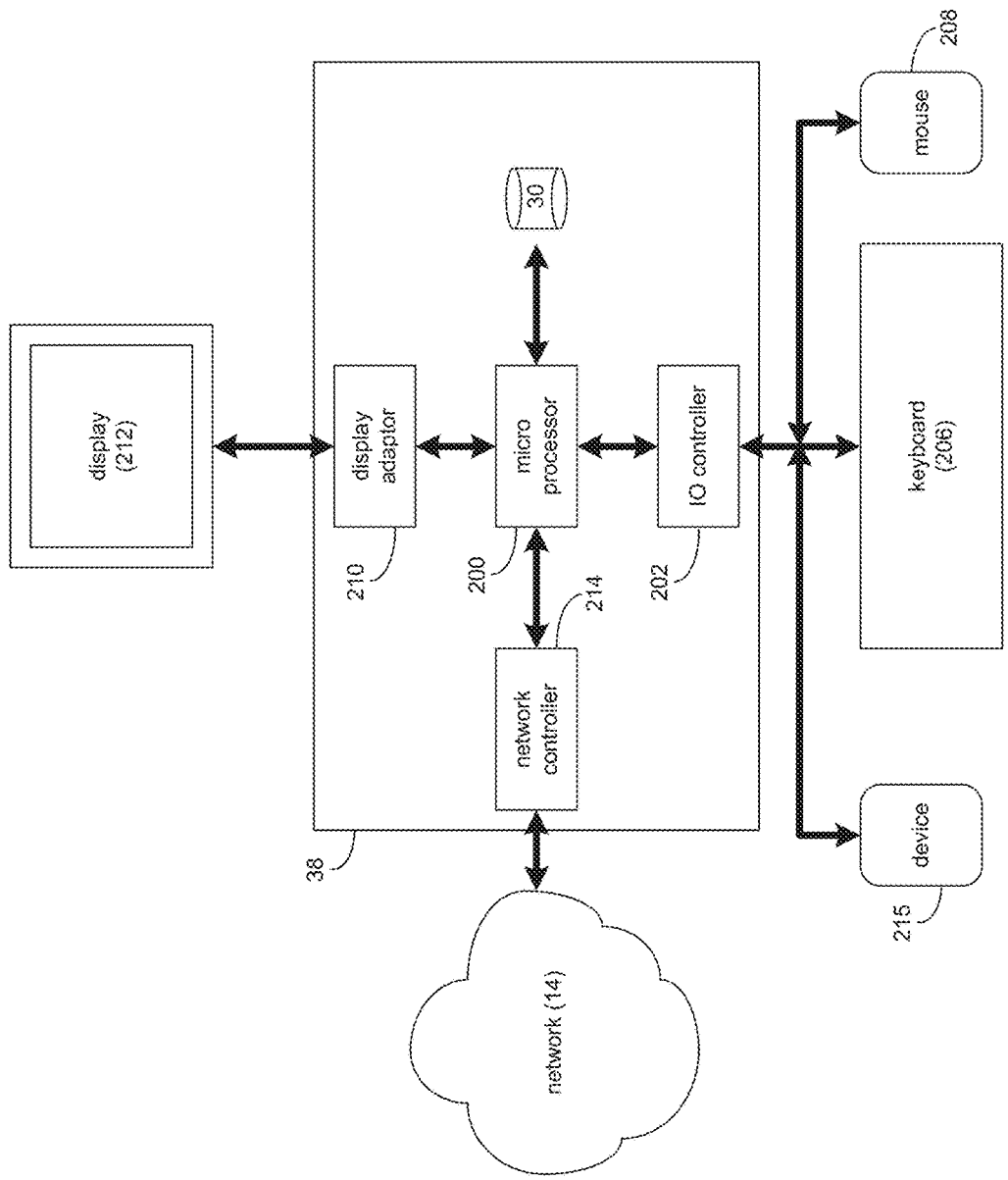
FIG. 2 is an example diagrammatic view of a client electronic device of FIG. 1 according to one or more example implementations of the disclosure.
Figure 3:
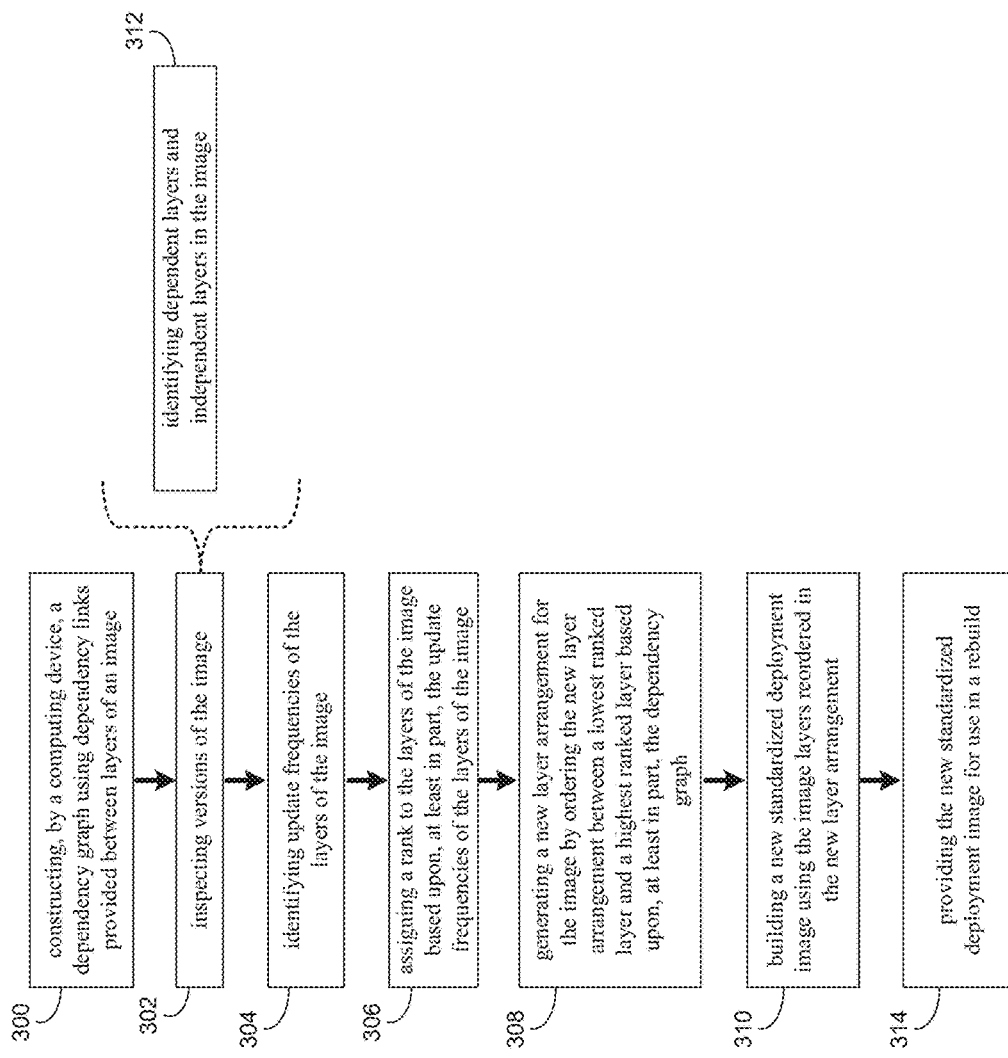
FIG. 3 is an example flowchart of an image process according to one or more example implementations of the disclosure.
Figure 4:
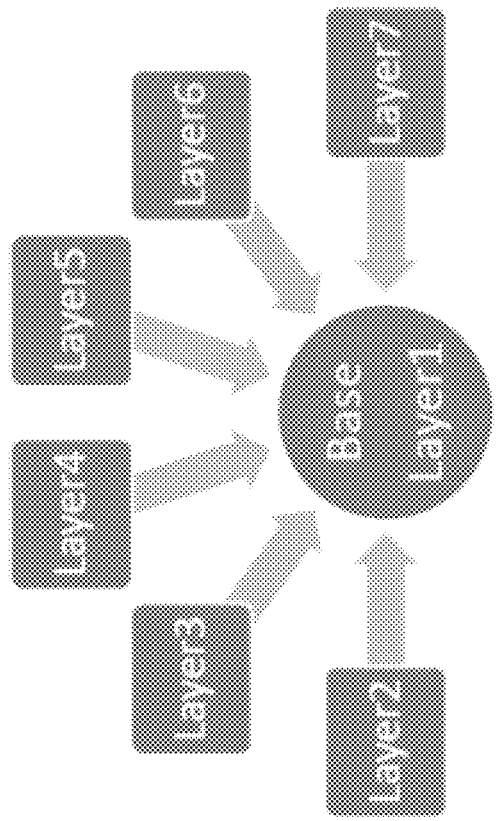
FIG. 4 is an example diagrammatic view of a layer dependency graph according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, image process 10 may be substituted for client electronic device 38 (in whole or in part) within FIG. 2, examples of which may include but are not limited to computer 12 and/or one or more of client electronic devices 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, given a set of "Docker" images and different versions of those images built periodically over a certain amount of time, image process 10 may at least help, e.g., improve of a technology, necessarily rooted in computer technology in order to overcome an example and non-limiting problem specifically arising in the realm of computer caching to improve the caching (e.g., in Docker builds) that may help CI pipelines to build a Docker image instantaneously and also address the image storage issues by, e.g., sharing layers among different images and rearranging the image layers based on the change history. It will be appreciated that the computer processes described throughout are not considered to be well-understood, routine, and conventional functions.

The Image Process:

As discussed above and referring also at least to the example implementations of FIGS. 3-8, image process 10 may construct 300, by a computing device, a dependency graph using dependency links provided between layers of an image. Image process 10 may inspect 302 versions of the image. Image process 10 may identify 304 update frequencies of the layers of the image. Image process 10 may assign 306 a rank to the layers of the image based upon, at least in part, the update frequencies of the layers of the image. Image process 10 may generate 308 a new layer arrangement for the image by ordering the new layer arrangement between a lowest ranked layer and a highest ranked layer based upon, at least in part, the dependency graph. Image process 10 may build 310 a new standardized deployment image using the image layers reordered in the new layer arrangement.

As will be discussed below, the present disclosure may include a technique to improve the layer ordering of a Docker image based on the history of image layers that have been built. This may be based upon, at least in part, e.g., providing a series of Docker images with the different versions of the Docker images built periodically and dependency information between the various layers. For example, in some implementations, image process 10 may construct 300, by a computing device, a dependency graph using dependency links provided between layers of an image. For instance, and referring at least to the example implementation of FIG. 4, an example layer dependency graph (e.g., layer dependency graph 400) is shown. In the example, image process 10 may construct 300 layer dependency graph 400 based on the dependency links provided between layers. For instance, in the example, assume a list with different versions of an image, e.g.:

a. registry.washington.ibm.com/test/sample-app:v1-latest,
  b. registry.washington.ibm.com/test/sample-app:v2-latest, and
  c. registry.washington.ibm.com/test/sample-app:v3-latest Further in the example, assume the following:
Child Layer Parent Layer
Layer 3 Layer 2
Layer 4 Layer 3
Layer 7 Layer 5

Generally, dependency links may denote dependency between the different layers. For example, Layer 1 may have instructions to create a directory named 'SETUP', Layer 2—Copy a file from '/' directory to the 'SETUP' created by Layer 1, which implies Layer 2 is dependent on Layer 1.

In some implementations, image process 10 may inspect 302 versions of the image. For example, in some implementations, inspecting 302 the versions of the image may include identifying 312 dependent layers and independent layers in the image. Inspecting 302 versions of the image (e.g., via the layer dependency graph 400) may help to identify 312 the dependent and independent layers in the image. Typically, as mentioned above, if a new layer has dependency on a previous layer to be built prior to its own execution, they may be dependent layers, whereas an independent layer may be the one that does not depend on any other layers to be pre-built. In some implementations, a base image layer may be at a center of the dependency graph, as every other layer may directly depend on it. In some implementations, image process 10 may inspect each version of the Docker image using an inspect API that may be provided by the Docker application. By inspecting 302 different versions of an image and its layers evolved over a period of a time, image process 10 may identify 312 the image layers that are updated frequently to the least modified layers based on the image identifier (ID). For instance, and referring at least to the example implementations of FIG. 5 and FIG. 6, an example layer inspection table 500 and example latest version Dockerfile 600 is shown respectively. In those figures, using Docker's inspect API, the history of each of the layers with their checksum information may be obtained (from layer inspection table 500), and from such an inspection, image process 10 may find the exact Dockerfile instructions in the latest version (shown in latest version Dockerfile 600). In the example, each layer in a Docker image may be identified by layer ID (obtained using, e.g., algorithm SHA-256, hex element, etc.), multiple layers corresponds to one image. During the continuous integration pipeline, if any of the layers are modified, their corresponding layer ID may be updated (via image process 10) based on the checksum, which in turn updates the image ID for a particular image to be built. By monitoring the different versions of an image with a set of layers in each particular image, image process 10 may measure the update frequency of each layer in an image based on the layer ID.

Thus, in some implementations, image process 10 may identify 304 update frequencies of the layers of the image and image process 10 may assign 306 a rank to the layers of the image based upon, at least in part, the update frequencies of the layers of the image, where the update frequencies of the layers of the image may be identified 304 using the above-noted image identifier (ID). For instance, and referring at least to the example implementation of FIG. 7, an example layer rank table (e.g., layer rank table 700) is shown. In the example, once the image layers are identified 304 based on their update history, image process 10 may assign 306 a rank to each of those layers based on their update frequency. In some implementations, ranking may be based on, at least in part, the modification history of each of the layers.

In some implementations, a highest rank may be assigned 306 to the layer of the image that is most frequently updated and a lowest rank may be assigned 306 to the layer of the image that is least frequently updated. For instance, the highest rank (e.g., rank 1) may be assigned to the layer that is most frequently modified compared to all other layers, and the lowest rank may be assigned to those layers that are least modified compared to all other layers. In some implementations, the base images (layers) declared as part of a FROM instruction in Dockerfile may be assigned the least (lowest) rank, since, e.g., it may be an independent layer. As can be seen in FIG. 7, it may be possible for multiple layers to have the same rank. For instance, by assigning ranks to each of the layers based on the inspection, image process 10 identified that the independent layers are 1, 2, 5 and 6, so those may be given the same lowest ranks.

It will be appreciated that by taking into consideration the meaning of the ranking, the ranking order may be reversed without departing from the scope of the disclosure. For instance, the lowest rank (e.g., rank 3) may be assigned to the layer that is most frequently modified compared to all other layers, and the highest rank may be assigned to those layers that are least modified compared to all other layers. However, for ease of discussion, the disclosure is described using the highest rank assigned to the layer that is most frequently modified compared to all other layers, and the lowest rank assigned to those layers that are least modified compared to all other layers.

In some implementations, image process 10 may generate 308 a new layer arrangement for the image by ordering the new layer arrangement between a lowest ranked layer and a highest ranked layer based upon, at least in part, the dependency graph. For example, image process 10 may generate 308 an improved (and new) layer arrangement for the given image by ordering (e.g., reordering) the layers from the lowest ranked layer(s) (e.g., least modified layer) to the highest ranked layer(s) (e.g., most modified layer) at the bottom, considering the above-noted layer dependency graph 400 for every rearrangement. This may improve caching, as the final reordered layer arrangement may help to improve caching in the upcoming build of that specific image, as the proposed layer arrangement may have most of the cacheable layers at the top that remained unchanged on the given prior versions. As a result, the bottom layers may have more chances for being rebuilt based on the historical data of inspecting older versions of image. For instance, and referring at least to the example implementation of FIG. 8, an example final reordering of the layers (e.g., final reordered layers 800) is shown. It may be possible that the lowest ranked layers are dependent on the higher ranked layers, and in that scenario, the parent layer may precede the child layer irrespective of the assigned ranks. Additionally, in some implementations, when the ranks are equal between layers (e.g.: rank 3 and rank 2), the current (existing) order in the Dockerfile may be followed.

In some implementations, image process 10 may build 310 a new standardized deployment image using the image layers reordered in the new layer arrangement, and in some implementations, image process 10 may provide 314 the new standardized deployment image for use in a rebuild, and the layers of the image may be shared across different images in a build. This newly built image with the new proposed layer arrangement may be tagged as the latest cache image and pushed to a registry or server periodically and that cache image may be used for any upcoming builds. In a typical continuous integration process, when a new version of an image needs to be built, the first step could be to pull the latest cache image available and then build the new image with 'Cache-From' API pointing to the latest cache image downloaded to the particular build machine. Thus, for example, image process 10 may build 310 an image from the reordered layers, and image process 10 may provide 314 this image to the Docker build cache from the Docker API to make use of effective cache processes (e.g., sharing layers among different images used as a cacheable image in upcoming builds), which may address one or more of the above-noted issues. As such, in the example, Docker image storage issues may be improved as the improved caching shares the layers across different images, which may significantly reduce the disk space needed to store images.

Thus, according to one or more example implementations, little or no human intervention is needed to analyze each of the layers in different versions of a Docker image, which may improve caching. Moreover, even complex build scripts with n number of layers may be reordered based on the ranking and dependency graphs. In some implementations, image process 10 may accomplish the present disclosure by being scheduled to run on a timely manner, so that image process 10 may proactively monitor each of the layers built periodically, reorder them, and notify developers on how frequently a layer has been modified (e.g., any new feature to an application or base image version change, updates to the corresponding layers on a routine basis that may be easily identified using the present disclosure, and developers may be notified about the changes with the cache layers used in the upcoming builds).

It will be appreciated that while a Docker file system is disclosed, the present disclosure may be similarly applied to non-Docker file systems or other types of container platforms that may have similar operations (e.g., Google® Kubernetes, Windows® Containers. As such, the use of Docker should be taken as example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    identifying update frequencies of the layers of the image;
    assigning a rank to the layers of the image based upon, at least in part, the update frequencies of the layers of the image;
    generating a new layer arrangement for the image by ordering the new layer arrangement between a lowest ranked layer and a highest ranked layer; and
    building a new deployment image using the image layers reordered in the new layer arrangement.

2. The computer-implemented method of claim 1, further comprising inspecting versions of the image, wherein inspecting the versions of the image includes identifying dependent layers and independent layers in the image.

3. The computer-implemented method of claim 1, further comprising constructing, by a computing device, a dependency graph using dependency links provided between layers of an image, wherein a base image layer is at a center of the dependency graph.

4. The computer-implemented method of claim 1, wherein the layers of the image are shared across different images in a build.

5. The computer-implemented method of claim 1, wherein the update frequencies of the layers of the image are identified using an image identifier.

6. The computer-implemented method of claim 1, wherein a highest rank is assigned to the layer of the image that is most frequently updated and a lowest rank is assigned to the layer of the image that is least frequently updated.

7. The computer-implemented method of claim 1, further comprising providing the new deployment image for use in a rebuild.

8. A computer program product residing on a computer readable storage medium having a plurality of instructions stored thereon which, when executed across one or more processors, causes at least a portion of the one or more processors to perform operations comprising:
    identifying update frequencies of the layers of the image;
    assigning a rank to the layers of the image based upon, at least in part, the update frequencies of the layers of the image;
    generating a new layer arrangement for the image by ordering the new layer arrangement between a lowest ranked layer and a highest ranked layer; and
    building a new deployment image using the image layers reordered in the new layer arrangement.

9. The computer program product of claim 8, further comprising inspecting versions of the image, wherein inspecting the versions of the image includes identifying dependent layers and independent layers in the image.

10. The computer program product of claim 8, further comprising constructing a dependency graph using dependency links provided between layers of an image, wherein a base image layer is at a center of the dependency graph.

11. The computer program product of claim 8, wherein the layers of the image are shared across different images in a build.

12. The computer program product of claim 8, wherein the update frequencies of the layers of the image are identified using an image identifier.

13. The computer program product of claim 8, wherein a highest rank is assigned to the layer of the image that is most frequently updated and a lowest rank is assigned to the layer of the image that is least frequently updated.

14. The computer program product of claim 8, further comprising providing the new standardized deployment image for use in a rebuild.

15. A computing system including one or more processors and one or more memories configured to perform operations comprising:
   identifying update frequencies of the layers of the image;
   assigning a rank to the layers of the image based upon, at least in part, the update frequencies of the layers of the image;
   generating a new layer arrangement for the image by ordering the new layer arrangement between a lowest ranked layer and a highest ranked layer; and
   building a new deployment image using the image layers reordered in the new layer arrangement.

16. The computing system of claim 15, further comprising inspecting versions of the image, wherein inspecting the versions of the image includes identifying dependent layers and independent layers in the image.

17. The computing system of claim 15, further comprising constructing a dependency graph using dependency links provided between layers of an image, wherein a base image layer is at a center of the dependency graph.

18. The computing system of claim 15, wherein the layers of the image are shared across different images in a build.

19. The computing system of claim 15, wherein the update frequencies of the layers of the image are identified using an image identifier.

20. The computing system of claim 15, further comprising providing the new deployment image for use in a rebuild.

\* \* \* \* \*